(No Model.)  2 Sheets—Sheet 1.
A. SCHUBERT.
SPRING VEHICLE.
No. 418,932. Patented Jan. 7, 1890.
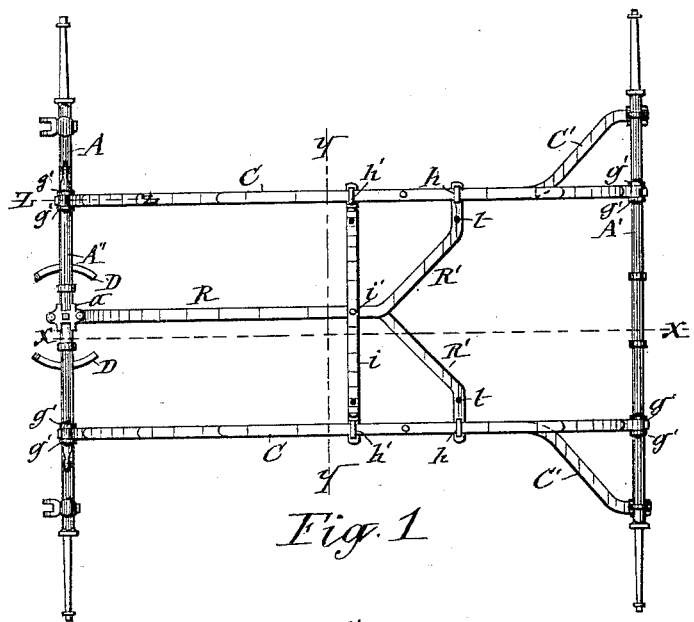
Fig. 1
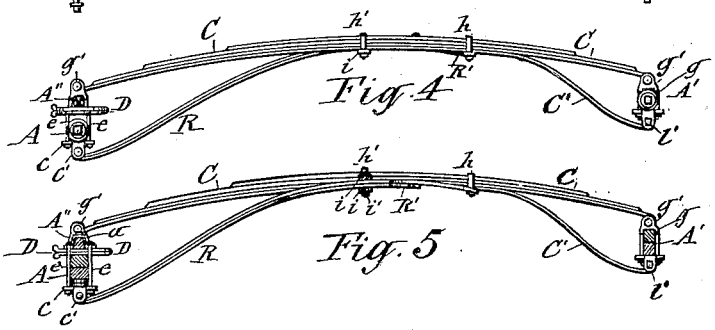
Fig. 4
Fig. 5
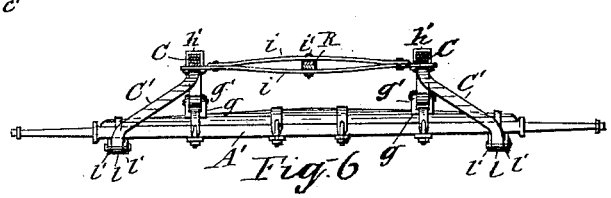
Fig. 6
Fig. 7
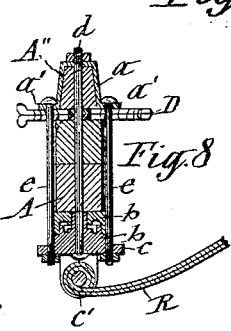
Fig. 8
Fig. 9
WITNESSES:
C. L. Bendixon
J. J. Laasz
INVENTOR:
August Schubert
BY
Duell, Laass + Duell
his ATTORNEYS (No Model.) 2 Sheets—Sheet 2.
A. SCHUBERT.
SPRING VEHICLE.
No. 418,932. Patented Jan. 7, 1890.
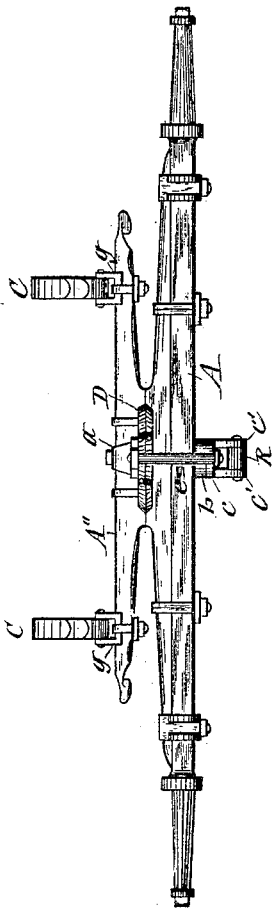
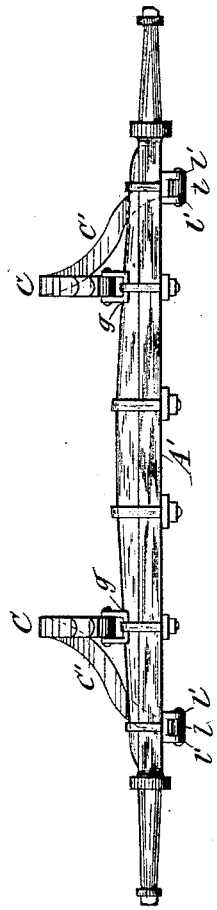
WITNESSES:
J. J. Laass
C. L. Bendixon
INVENTOR:
August Schubert
BY
Duell, Laass & Duell
his ATTORNEYS

UNITED STATES PATENT OFFICE.

AUGUST SCHUBERT, OF ONEIDA, NEW YORK.

SPRING-VEHICLE.

SPECIFICATION forming part of Letters Patent No. 418,932, dated January 7, 1890.

Application filed September 2, 1889. Serial No. 322,809. (No model.)

*To all whom it may concern:*

Be it known that I, AUGUST SCHUBERT, of Oneida, in the county of Madison, in the State of New York, have invented new and useful Improvements in Spring-Vehicles, of which the following, taken in connection with the accompanying drawings, is a full, clear, and exact description.

This invention relates to that class of spring-vehicles in which the reach is of the form of a spring and combined with the side springs in such a manner as to assist in supporting the body of the vehicle; and the invention consists in an improved construction and combination of parts, as hereinafter described, and set forth in the claims.

Referring to the annexed drawings, Figure 1 is a top plan view of a spring-vehicle embodying my improvements. Figs. 2 and 3 are respectively enlarged front and rear end views of the same. Fig. 4 is a side elevation. Fig. 5 is a vertical longitudinal section on line $x\ x$, Fig. 1. Fig. 6 is a transverse section on line $y\ y$, Fig. 1, as viewed toward the rear of the vehicle. Fig. 7 is a detached plan view of the bottom leaf of one of the side springs. Fig. 8 is an enlarged vertical transverse section through the center of the front running-gear; and Fig. 9 is an enlarged vertical transverse section through the head-block on line $z\ z$, Fig. 1.

Similar letters of reference indicate corresponding parts.

A and A' represent, respectively, the front and rear running-gears or axles of the vehicle.

A'' represents the head-block mounted on the front axle and pivoted thereto by the king-bolt $e$, in the manner hereinafter described, and D denotes the so-called "fifth-wheel," interposed between the head-block and axle or usual bed-piece secured to the top of said axle.

C C represent the side springs, which are each composed of a plurality of leaves, all lying with their central and front end portions contiguously one upon the other, the rear end portion of the lower leaf C' being deflected laterally outward and terminating with a shackle-eye $l$, which is inserted between perforated ears $l'$, clipped to the under side of the end portion of the hind axle near the spindle thereof. It will thus be observed that the main leaf of the side spring consists of one continuous piece extending from the head-block to the end of the hind axle, which is one of the salient features of my invention. The rear end portions of the superposed leaves of the side spring being maintained in line with the front end portions and mounted on top of the hind axle, and connected thereto by a saddle $g$, clipped to the axle and formed with upward-projecting perforated ears, between which enters the shackle-eye formed on the end of the lower of the aforesaid superposed spring-leaves, and a bolt passing through said shackle-eye and ears, completes the connection of the rear end of the side spring to the hind axle. There are two sets or pairs of the aforesaid saddles $g\ g$, respectively, on top of the hind axle and end portions of the head-block and equidistantly from the centers thereof, so that the main portions of the side springs are held parallel to each other. The front ends of the bottom leaves of the two side springs are formed with shackle-eyes, and are mounted on the head-block by connecting the said shackle-eyes to the perforated ears of the saddles $g\ g$, as before described.

In connection with the side springs I employ a spring-reach R, terminating with lateral arms R' R', extending at right angles across the under side of the side springs and fastened thereto, said lateral arms being perforated at $t\ t$ for the reception of bolts by which to fasten thereto the body of the vehicle, which rests on said arms. I preferably form said reach of two leaves, which are formed with straight main portions lying contiguously one upon the other and coupled to the front running-gear, as hereinafter described, and terminating at their rear ends with lateral outward deflections R' R', which extend at right angles across the under side of the side springs, including the bottom leaf C' thereof, and are fastened to said springs by clips $h\ h$, embracing the latter. The connection of the said spring-reach with the front running-gear is made as follows, to wit: Upon the center of the head-block A'', I mount a saddle $a$, which closely embraces said head-block and is formed with rearward and forward projecting perforated ears $a'\ a'$, and is provided with a bolt-hole through its center. On the bottom of the front axle A, I place stationary a plate $b$, provided with a pivot bearing on its under side, on which is pivoted a similar plate $b$, which is supported by a clip-tie $c$, extending across the under side of the said pivoted plate and held thereon by means of tie-bolts $e\ e$, passing through the aforesaid ears $a'\ a'$ of the saddle $a$, and through the end portions of the clip-tie, as shown in Fig. 8 of the drawings. Said clip-tie is formed with rigid pendent perforated ears $c'\ c'$, between which is inserted a shackle-eye formed on the front end of the reach R, and connected to said ears by a bolt through said parts. The king-bolt $d$ passes through the saddle $a$ and clip-tie $c$. Across the top and bottom of the straight main portion of the reach R, I place two metal bars $i\ i$, which have their end portions lying closely, one upon the other, and extending across the under side of the straight main portions of side springs C C, and fastened thereto by clips $h'\ h'$. A bolt or rivet $i'$ passes through the centers of the bars $i\ i$ and intervening reach R and securely ties said parts together. The bars $i\ i$ are also perforated near the inner edges of the side springs for the reception of bolts, by which the body resting thereon is fastened thereto.

Having described my invention, what I claim as new, and desire to secure by Letters Patent, is—

1. In a spring-vehicle, the side spring composed entirely of a plurality of leaves of spring-steel, all lying with their central and front end portions contiguously one upon the other, and the front end of the lower leaf hung on the head-block and the rear end portion of said leaf being deflected laterally outward from the superposed leaves and hung on the hind axle, near the spindle thereof, and the rear end portions of the superposed leaves being maintained in line with the front end portions thereof and mounted on the hind axle, substantially as set forth and shown.

2. The combination, with the head-block and hind axle, of two sets of perforated ears fastened one to the top of the end portions of the head-block and the other to the top of the hind axle equidistantly from the centers thereof, and side springs composed of a plurality of leaves, all lying with their central and front end portions contiguously one upon the other, and the bottom leaves having their front ends formed with shackle-eyes and hung thereby to the perforated ears on the head-block, the rear end portions of said bottom leaves being deflected laterally outward and terminating with the shackle-eyes hung on perforated ears clipped to the under side of the hind axle, and the rear ends of the superposed leaves being maintained in line with the front end portions and hung on the perforated ears of the hind axle, substantially as described and shown.

3. In combination with the running-gears and side springs, perforated ears secured to the center of the under side of the front axle, a spring-reach composed of two leaves formed with straight main portions lying one upon the other and formed at their front ends with a shackle-eye entering between the aforesaid ears and connected thereto, and the rear ends of said leaves being deflected outward and extending across the under side of the side springs, and clips fastening the said ends to the said springs, substantially as described and shown.

4. In combination with the running-gears and side springs, a spring-reach composed of two leaves formed with straight main portions lying one upon the other and connected to the front axle, and terminating at their rear ends with outward deflections extending across the side springs and fastened thereto, and cross-bars secured to the top and bottom of the main portions of the reach and clipped to the under side of the side springs, substantially as described and shown.

5. The combination, with the running-gears, of side springs, each composed of a plurality of leaves lying with their central and front end portions contiguously one upon the other, the front end of the bottom leaf hung on the head-block, the rear end portion of said leaf being deflected outward and hung on the end portion of the hind axle, the rear end portions of the superposed leaves being maintained in line with front end portions and mounted on the hind axle, a spring-reach composed of two leaves formed with straight main portions lying contiguously one upon the other and coupled to the front running-gear, and terminating at their rear ends with outward deflections clipped to the side springs, and two cross-bars secured to the top and bottom of the main portion of the spring-reach and clipped to the side springs, substantially as described and shown.

In testimony whereof I have hereunto signed my name this 29th day of August, 1889.

AUGUST SCHUBERT. [L. S.]

Witnesses:
T. H. JURDEN,
IRVING B. NILES.